United States Patent [19]

Kurihara et al.

[11] 3,989,847

[45] Nov. 2, 1976

[54] PROCESS FOR PREPARATION OF SEASONINGS DERIVED FROM ANIMAL MEAT

[76] Inventors: Shinji Kurihara, 7-8, 3-chome, Nishicho; Kazuharu Osazima, 1037-8, Shirahagi, Mizunomicho, both of Fukuyama, Hiroshima, Japan

[22] Filed: Sept. 23, 1975

[21] Appl. No.: 615,889

[30] Foreign Application Priority Data

May 20, 1975  Japan.............................. 50-60079

[52] U.S. Cl..................................... 426/7; 426/55; 426/533
[51] Int. Cl.²......................................... A22C 18/00
[58] Field of Search ................. 426/56, 55, 59, 533, 426/638, 646, 643, 7

[56] References Cited
UNITED STATES PATENTS

| | | | |
|---|---|---|---|
| 3,113,030 | 12/1963 | Brody ................................. | 426/55 |
| 3,692,538 | 9/1972 | Moss et al............................ | 426/59 |
| 3,796,811 | 3/1974 | Huth et al........................... | 426/533 X |

*Primary Examiner*—R. B. Penland
*Attorney, Agent, or Firm*—Browdy and Neimark

[57] ABSTRACT

A process for the preparation of seasonings derived from animal meats, which comprises grinding raw edible portions of fishery products or predatory animals or raw remnants composed mainly of bones which are left after collection of edible parts, head parts, intestinal parts or meat parts from fishery products or predatory animals, or raw small fishes, crustaceans, planktons or shellfishes of a low utility value, to recover meat contained therein in the form of a mud-like slurry, adding an acid to the slurry to maintain a weakly acidic pH of 4.0 to 5.0, agitating and heating the slurry at a low temperature not exceeding 50° C. to effect initial autolysis, further adding an acid to the slurry to lower the pH to about 2.5, boiling the slurry at about 90 to about 100° C to effect initial acid decomposition, adding an alkali to the slurry to effect neutralization and adjust the pH to 6.0 to 7.0, separating coagulated substances, insoluble substances and fats from the slurry, and filtering and refining the resulting extract to obtain a liquid or powdery product.

8 Claims, No Drawings

PROCESS FOR PREPARATION OF SEASONINGS DERIVED FROM ANIMAL MEAT

Sodium glutamate, sodium inosinate, liponucleotide and the like are utilized as chemical seasonings, and a taste resembling that attained by seasonings derived from animal meat can be obtained by combined use of these chemical seasonings or use of mixtures thereof. However, the taste attained by an extract of a natural material has in combination specific flavor, smell, astringency and savor not attainable by chemical seasonings, and such taste of a natural material cannot be obtained only by use of mixtures of chemical seasonings.

It is considered that the reason is that natural seasonings have specific composite flavor, smell and astringency inherent of natural materials and the taste is greatly influenced by this combination.

It is therefore a primary object of this invention to provide a process for preparing a seasoning extracted from a natural material which can give a taste not attainable by chemical seasonings. According to the process of this invention, not only edible portions of fishery products or predatory animals but also remnants composed mainly of bones which are left after collection of head parts, intestinal parts or meat parts of fishery products or predatory animals and small fishes, crustaceans, planktons or shellfishes which are caught but are of low utility value are used as raw materials and natural seasonings having in combination various composite flavor, smell and savor components are extracted from flesh portions, skin portions and fiberous portions contained in and sticking to these raw materials.

Another object of this invention is to provide a process for preparing a seasoning additive which is useful not only for ordinary cooking but also for improving the flavor and smell to boiled and kneaded food products such as Kamaboko (boiled fish paste), Chikuwa (boiled and roasted fish paste) and Hanpen (pounded fish cake) or imparting to such boiled and kneaded food products natural flavor or smell not possessed by them.

Still another object of this invention is to provide a process for the preparation of seasonings, according to which good taste components can be effectively extracted by initial amino acid decomposition by autolysis utilizing the enzymatic activity in the meat portion. Taste components that cannot be extracted sufficiently by boiling conducted after said autolysis can easily be extracted by conducting boiling under acidic conditions to effect initial acid decomposition, and simultaneously, fishy smell can be removed assuredly.

A further object of this invention is to provide a process for the preparation of seasonings, according to which solids left after collection of the intended seasoning, such as coagulated substances and insoluble substances can be utilized as protein substances for production of foodstuffs or feedstuffs and also fats can be separated and collected very easily, whereby the raw materials can be utilized very efficiently.

This invention will now be described in detail.

The first step of the process of this invention is a step of mechanical separation of a raw material. More specifically, an edible portion of a fishery product or predatory animal or a raw remnant left after collection of a meat portion from a fishery product or predatory animal, or a raw small fish or shellfish of a low utility value is subjected to a grinder and a mincing machine and then to a separator to separate the raw material into a portion composed mainly of meat and a residual portion composed of bones and the like.

As the raw material to be used in this invention, there can be mentioned, for example, beef relatively free of a peculiar taste, mutton having a peculiar smell, meats of predatory animals such as pig and chicken, fishes of reddish meat having a strong smell such as saurel, sardine and mackerel, fishes of white meat having a relatively weak smell such as croaker and walleye pollack, crustaceans such as lobster, shrimp, crab and giant clam, shellfishes such as short-necked clam, clam, hard-shelled mussel, scallop and purple hard-shelled mussel, and planktons such as krill.

As means for separating portions composed mainly of meat, there is employed a separator comprising a rotary cylinder having a great number of small holes and a belt moving while having a contact with a part of the peripheral face of said cylinder. The ground raw material is fed between the rotary cylinder and the belt and is crushed, whereby a mud-like slurry of the meat portion is separated and collected in the interior of the cylinder through the small holes, while ground bones are pulverized, and transported and discharged in the state held between the cylinder and the belt.

Remaining bone pieces and other solid substances are completely removed from the resulting mud-like slurry by means of a strainer, a centrifugal separator or a press, and thus is recovered a mud-like slurry free of solids.

Recovery of meat portions from head parts or remnants of fishery products or predatory animals has heretofore been accomplished by a manual work of chipping off meat. Accordingly, the operation efficiency is very low and the meat recovery ratio is very low. The characteristic feature of this step of the process of this invention is that meat can be recovered at a high operation efficiency in a good yield by collecting meat from remnants in the form of a mud-like slurry. Further, small fishery products which are hardly utilized or are of no practical value because of their small sizes even though they are caught, for example, small fishes, small crabs, shrimps and other small crustaceans, and small shellfishes and planktons, can be used as the raw material, and small quantities of meat portions contained in these small fishery products can be recovered most effectively.

The second step of the process of this invention is an extraction step.

In order to prevent putrefaction of the so collected mud-like slurry by intrusion of bacteria, a small amount of an acid is added to the slurry to maintain a weakly acidic pH of 4.0 to 5.0 and the slurry is uniformly agitated for 30 minutes to 1 hour while heating the slurry at a liquid temperature not exceeding 50°C., whereby the activity of enzymes in raw meat is promoted and initial amino acid decomposition is performed by autolysis.

Then, an acid is further added to the slurry to lower the pH to about 2.5, namely 2.0 to 3.0, to thereby make the slurry strongly acidic, and the slurry is boiled at a high temperature of 90° to 100° C. for about 10 to about 30 minutes.

At this step, after very initial autolysis has been conducted to such an extent that the interior texture of meat is loosened, the slurry is boiled under strongly acidic conditions to advance initial acid decomposition in the loosened texture, whereby taste components contained in the texture are dissolved out and extracted most effectively.

When the liquid is immediately neutralized and boiled just after initial autolysis and coagulated substances and insoluble substances are separated, a fishy smell inherent of the raw material is left in the resulting decomposition liquid and it is difficult to remove completely the fishy smell even by the subsequent boiling step or the like. Thus, this undesired fishy smell is left in a purified product and the quality or commercial value of the product is degraded by this fishy smell. Another critical feature of this invention resides in the finding that when the slurry coming from the initial autolysis is boiled at a high temperature at a strongly acidic pH of about 2.5, this fishy smell can easily be removed by acid decomposition.

Accordingly, in the process of this invention, by the initial acid decomposition to be conducted after the initial autolysis, taste components that cannot be sufficiently extracted by mere boiling subsequent to initial autolysis can be extracted and dissolved out most effectively, and the fishy smell left in the extracted liquid is removed by this acid decomposition. Therefore, the process of this invention is an effective and advantageous process in which natural good taste, flavor and perfume components of animal meat can be extracted completely.

It is necessary that initial autolysis and initial acid decomposition should be conducted moderately and should not be advanced excessively. If the meat portion is completely autolyzed or acid-decomposed, in addition to taste components, large quantities of amino acids and other decomposition products are dissolved out and extracted, and the purity of the taste is lowered.

After initial autolysis and subsequent initial acid decomposition under strongly acidic conditions for decomposition and removal of the fishy smell, the extracted liquid is neutralized by adding an alkali to adjust the pH to 6.0 to 7.0, and coagulated substances and insoluble substances are separated and removed. In case fats are contained, fats are removed by an oil-water separating centrifugal separator.

Then, the resulting liquid is filtered to obtain a yellowish brown purified liquid having a very good composite taste free of a fishy smell.

The so obtained purified liquid has astringency, fragrance and taste of the raw fishery product or predatory animal which have been completely extracted from such raw material, and it has natural taste and flavor not attainable by a chemical seasoning having a simple taste.

The concentration of this purified liquid may be increased by heating and condensation, or it may be powdered without loss of astringency and taste by vacuum freeze-drying or spray drying.

Coagulated and insoluble substances separated from the liquid are made free of fats, and hence, they can be used as parts or all of raw materials of meat foods such as hamburgers, croquettes and meat dumplings and as feedstuffs for domestic animals. Further, separated fats may be purified and used as edible fats or fish oils.

As pointed out hereinbefore, the second step of the process of this invention is to extract taste components effectively and remove fishy smells by performing initial acid decomposition under strongly acidic conditions subsequently to initial autolysis, and this second step constitutes one of important features of this invention.

Incidentally, comparative tests concerning the taste and fishy smell were conducted between a pasty product obtained by adjusting the pH of the liquid coming from the initial autolysis step to a neutral value, boiling the liquid, separating insoluble substances and concentrating the purified liquid and a pasty product obtained by concentrating a purified liquid obtained according to the process of this invention.

Sample A: A head of a croaker was used as a raw material, and a seasoning was obtained by initial autolysis alone.

Sample B: The same amount of a croaker head as used in the case of the sample A was first subjected to initial autolysis and then subjected to initial acid decomposition to obtain a seasoning.

Each of the samples A and B was diluted to a concentration indicated below, and dilutions were subjected to a sensitivity test by a panel of 10 men. Results obtained are shown below.

| Degree of Dilution | Taste | | | Fishy Smell | | |
|---|---|---|---|---|---|---|
| | A is better | B is better | not different | B is more smelly | A is more smelly | not different |
| 1.0 % | 5 | 3 | 2 | 0 | 8 | 2 |
| 3.0 % | 3 | 2 | 5 | 0 | 8 | 2 |
| 5.0 % | 2 | 2 | 6 | 0 | 7 | 3 |
| 10.0 % | 1 | 1 | 8 | 1 | 5 | 4 |
| Total | 11 | 8 | 21 | 1 | 28 | 11 |

EXAMPLE 1

A head of a croaker, a kind of fish caught by a dragnet in the west, is washed and drained, and 100 Kg of such heads are weighed.

The weighed heads are subjected to a grinder and a separator to collect 61.0 Kg of a mud-like slurry.

10 % hydrochloric acid is added to the slurry to adjust the pH of the entire slurry to 4.5, and the temperature is elevated to 45° C. and the slurry is agitated for 1 hour to effect initial amino acid decomposition by autolysis. Subsequently, hydrochloric acid is added to lower the pH of the entire slurry to 2.5, and the slurry is boiled at 95° to 98° C. for about 30 minutes to remove a fishy smell by decomposition.

Then, the slurry is neutralized by 10.0 % aqueous caustic soda to adjust the pH of the entire slurry to 6.5, and the slurry is separated into 9.5 Kg of a meat portion (solids) and a liquid portion by means of a basket type continuous centrifugal separator. Then, the liquid portion is separated into 1.2 Kg of a fish oil and 27.5 Kg of a separated liquid by means of an oil-water separating centrifugal separator of the sealed type.

Then, 27.5 Kg of the so obtained separated liquid is filtered and purified by a filtering machine to obtain 21.5 Kg of a purified liquid having a pleasant fragrance free of a fishy smell of the starting croaker and a good taste in combination. Then, the purified liquid is condensed under reduced pressure to obtain 13.0 Kg of a concentrated and purified seasoning for food.

9.5 Kg of the separated meat portion can be used directly as a feedstuff for domestic animals, and 1.2 Kg of the recovered fish oil has a very good quality.

EXAMPLE 2

100 Kg of chicken remnants left after collection of meat are weighed, and while adding pure water in an amount corresponding to about ½ of the remnants, the remnants are subjected to a grinder and a separator to obtain 93.0 Kg of a mud-like slurry.

In the same manner as described in Example 1, initial amino acid decomposition is conducted; and hydrochloric acid is added to adjust the pH to 2.0 Then, the slurry is boiled for about 30 minutes and the pH is adjusted to 6.8.

Then, the slurry is separated into a liquid portion and 12.9 Kg of a solid portion by means of a basket type continuous centrifugal separator, and the liquid portion is separated into 13.0 Kg of a fat and 47.0 Kg of a separated liquid.

The so obtained separated liquid is filtered and purified to obtain 41.6 Kg of a purified liquid having a good taste inherent of chicken meat and a pleasant fragrance. A suitable amount of a binder is added to this purified liquid, and the mixture is powdered by means of a spray drier to obtain 12.0 Kg of a light-yellow powdery product having a good taste.

12.9 Kg of the solid portion can be used as a raw material of a meat food such as meat dumplings and hamburgers. The fat can be used as an edible oil or can be used for industrial purposes.

EXAMPLE 3

Raw fishes comprising miscellaneous small fishes and small crabs which have been caught by a dragnet but which cannot be utilized as they are, undergo washing and draining, and 100 Kg of the raw fishes are weighed.

Then, in the same manner as described in preceding Examples, the raw fishes are subjected to a grinder and a separator to obtain 71.0 Kg of a mud-like slurry.

The slurry is subjected to initial amino acid decomposition under weakly acidic conditions, and the pH of the entire slurry is lowered to 3.0 and the slurry is boiled for about 30 minutes. Then, 13.4 Kg of coagulated and insoluble substances are separated by means of a basket type continuous centrifugal separator to recover 48.0 Kg of a liquid.

The so obtained separated liquid is filtered and purified to obtain 33.0 Kg of a purified liquid having a good taste free of a fishy smell. A binder is added to this purified liquid and the mixture is powdered by means of a spray drier to obtain 11.5 Kg of a light yellow powdery seasoning for foods.

The separated coagulated and insoluble substances can be used as a feedstuff for domestic animals.

EXAMPLE 4

Edible mutton meat is subjected to a grinder type mincing machine having passage holes having a diameter of 6.0 mm, and 140.0 Kg of the ground meat portion is mixed with the same amount of water, and while they are blended and agitated in a mixer, 10 % hydrochloric acid is added to adjust the pH of the entire slurry to 4.5. The slurry is agitated at 45° C. for about 1 hour to effect initial autolysis of proteins, and hydrochloric acid is further added to adjust the pH to 2.8 and the slurry is boiled at 90° to 95° C. for about 20 minutes. Then, caustic soda is added to the slurry to adjust the pH to 6.8.

Then, the slurry is separated into a liquid portion and 67.5 Kg of a meat portion (solids), and the liquid portion is subjected to an oil-water separating centrifugal separator of the sealed type to separate it into 31.0 Kg of a fat and 98.5 Kg of a separated liquid.

The separated liquid is concentrated, and filtered and purified to obtain 67.2 Kg of a light-yellow extract free of a mutton smell but having a good taste or flavor.

The so obtained extract can hardly be distinguished from an extract obtained from beef with respect to the taste and flavor. When this extract is further concentrated or dried by spray drying or vacuum freeze-drying, a highly concentrated seasoning having a very good taste can be obtained.

The meat portion (solids) is composed of defatted and minced meat free of a mutton smell and having a good elastic texture and a very good touch to the mouth. Accordingly, it is very suitable as a cooking meat material for hamburgers, croquettes and minced balls. When the separated fat is cooled and solidified, it is converted to a white solid mass, which can be used as an edible fat of good quality having a milky fragrance.

EXAMPLE 5

10.0 Kg of pork with bones is weighed and subjected to a grinder and a separator. The remnants composed mainly of bones are removed to obtain 9.36 Kg of a meat portion in the form of mud-like slurry.

The meat portion is mixed with the same amount of water, and while the mixture is mingled and agitated in an agitator, the pH of the entire mixture is adjusted to 4.5 by addition of 10 % hydrochloric acid. Then, the mixture is agitated at 45° C. for 1 hour to effect initial autolysis of proteins, and hydrochloric acid is further added to adjust the pH to 2.8 and the mixture is boiled at 90° to 95° C. for about 20 minutes. Then, the pH is adjusted to 6.8 by addition of an alkali.

Then, the resulting slurry is separated into a liquid portion and 4.25 Kg of a meat portion (solids), and the liquid portion is further separated into 3.31 Kg of a fat and 5.80 Kg of a separated liquid.

The separated liquid is concentrated, and filtered and purified to obtain 3.78 Kg of a light-yellow extract having a good taste and free of an unpleasant smell.

When the so obtained extract is further concentrated or dried by a vacuum freeze-drying method or the like, a highly concentrated seasoning for meat having a good quality and a good taste can be obtained.

When the separated fat is purified and cooled, high quality lard which can be used as an edible fat in various fileds can be obtained. The separated meat portion has an elastic fine texture free of a fat and it can be suitably used as a heated and boiled meat of very high quality for hamburgers and croquettes. Processed foods having a higher quality than processed foods prepared from raw meat can be obtained from this meat portion.

EXAMPLE 6

33.0 Kg of krills are weighed and they are directly treated with a deboner having pores of a diameter of about 1.5 mm to remove shells. Thus is obtained 28.0 Kg of a meat portion in the form of a mud-like slurry.

The meat portion is mixed with the same amount of water, and while they are blended and agitated in an agitator, 10 % hydrochloric acid is added to adjust the pH of the entire mixture to 4.5. Then, the slurry is agitated at 40° C. for about 30 minutes to effect initial autolysis of proteins, and hydrochloric acid is further added to adjust the pH to 3.0 and the slurry is boiled at 85° to 90° C. for about 10 minutes. Then, the pH is adjusted to 6.5 by addition of caustic soda.

The slurry is separated into 29.8 Kg of a liquid portion and 17.0 Kg of a meat portion (solids) by means of a basket type continuous centrifugal separator.

The liquid portion is concentrated, and filtered and purified to obtain 14.8 Kg of an extract having a good taste and a purple brown color. This extract has taste and flavor resembling those of an extract obtained from giant clams caught in Japan, and it is a condensed amino acid liquid having a good taste. When it is further concentrated or dried by vacuum freeze-drying or the like, a dark purple, highly concentrated seasoning having a very good taste can be obtained.

The separated meat portion has an elastic texture having a touch resembling that of powdered fish, and the taste and flavor of the meat portion resemble those of a mixture of lobsters and giant clams caught in Japan.

The shells separated at the first step have a beautiful reddish color and are very soft, and when they are incorporated into materials for rice crackers or fish pastes, there are obtained beautiful processed foods.

EXAMPLE 7

Heads and intestinal portions are removed from 250 Kg of mackerels and the remainder is subjected to a grinder and a separator to remove remnants such as bones and skins and obtain 175 Kg of a ground fish meat.

80 Kg of water is added to the fish meat, and while the mixture is blended and agitated in an agitator, 10 % hydrochloric acid is added to adjust the pH of the entire mixture to 4.0. Then, the resulting slurry is agitated at 40° C. for about 30 minutes to effect initial autolysis of proteins, and hydrochloric acid is further added to adjust the pH to 2.5 and the slurry is boiled at 90° to 95° C. for about 20 minutes. Then, the pH is adjusted to 6.8 by addition of an alkali.

Then, the slurry is separated into a liquid portion and 75.3 Kg of a meat portion (solids) by means of a basket type continuous centrifugal separator. Then, the liquid portion is further separated into 26.5 Kg of a fat and 93.5 Kg of a separated liquid.

The separated liquid is concentrated, and filtered and purified to obtain 65.2 Kg of a yellowish brown extract having a good taste and free of a fishy smell. When this extract is further concentrated or dried by vacuum freeze-drying or the like, a highly concentrated seasoning having a good taste is obtained.

The separated meat portion is free of a fat and has a texture resembling that of powdered fish, and it is free of a fishy smell. When it is mixed with flour or ground meat of a raw fish, there can be obtained as cooling material for fried fish pastes or meat dumplings. The separated fat is utilized as a so-called fish oil after purification.

EXAMPLE 8

150 Kg of shucked raw purple hard-shelled mussels are weighed, and treated with a deboner having passage holes of a diameter of 6.0 mm to remove fibrous substances and other remnants and recover 138 Kg of a meat portion in the form of a mud-like slurry.

While the slurry is agitated in an agitator, 10 % hydrochloric acid is added to adjust the pH of the entire slurry to 4.5, and the slurry is agitated at 40° C. for about 30 minutes to effect initial amino acid decomposition. Then, hydrochloric is further added to adjust the pH to 3.0 and the slurry is boiled at 85° to 90° C. for about 10 minutes. The pH is adjusted to 6.5 by addition of an alkali.

The slurry is separated into 57.6 Kg of a liquid portion and 45.2 Kg of a meat portion by means of a basket type continuous centrifugal separator.

The separated liquid is concentrated, and filtered and purified to obtain 38.5 Kg of an extract having a good taste. When this extract is further concentrated or dried by vacuum freeze-drying or the like, a highly concentrated seasoning having a very good taste is obtained.

The heated and boiled meat is dark brown and has a fine texture resembling that of powdered fish. When it is mixed suitably with flour or ground fish meat, a cooking material having a good taste for fried foods or the like can be obtained, and this cooking material can be used in various manners as not expected of raw mussel meat.

What is claimed is:

1. A process for the preparation of seasonings derived from animal meat, which comprises grinding a raw animal meat containing material to recover meat contained therein in the form of a slurry, adding an acid to the slurry to adjust the pH within a range of from 4.0 to 5.0, agitating and heating the slurry at a temperature not exceeding 50° C. to promote in situ enzyme activity and begin amino acid decomposition of protein by autolysis, further adding an acid to the slurry to lower the pH to about 2.5, boiling the slurry at a temperature ranging from 90° to 100° C. to effect moderate acid decomposition and thereby facilitate dissolving out and extraction of taste components contained in the meat, adding an alkali to the slurry to effect neutralization and adjust the pH to 6.0 to 7.0, separating the resulting coagulated protein substances, insoluble protein substances and fats from the slurry, and filtering the residual liquid extract.

2. A process according to claim 1 wherein the raw animal material is a fish meat.

3. A process according to claim 1 wherein the raw animal material is a meat of a predatory animal.

4. A process according to claim 3 wherein pure water is added in forming a slurry from the raw animal material.

5. A process according to claim 1 wherein the raw animal material is a meat of a domestic fowl.

6. A process according to claim 5 wherein pure water is added in forming a slurry from the raw animal material.

7. A process according to claim 1 wherein the raw animal material is a shellfish.

8. A process according to claim 1 wherein the raw animal material is a plankton.

* * * * *